(12) United States Patent
Liik et al.

(10) Patent No.: US 9,036,790 B2
(45) Date of Patent: *May 19, 2015

(54) CALL RE-ESTABLISHMENT

(71) Applicant: Skype, Dublin (IE)

(72) Inventors: Devid Liik, Tallinn (EE); Mart Oruaas, Tallinn (EE); Stefan Strommer, Stockholm (SE); Mihails Velenko, Riga (LV)

(73) Assignee: Skype, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 14/041,940

(22) Filed: Sep. 30, 2013

(65) Prior Publication Data

US 2014/0029732 A1    Jan. 30, 2014

Related U.S. Application Data

(63) Continuation of application No. 13/073,596, filed on Mar. 28, 2011, now Pat. No. 8,548,125.

(30) Foreign Application Priority Data

Sep. 2, 2010  (GB) .................................. 1014615.7

(51) Int. Cl.
H04M 1/24        (2006.01)
H04M 3/42        (2006.01)
(Continued)

(52) U.S. Cl.
CPC ....... *H04M 3/42195* (2013.01); *H04L 65/1069* (2013.01); *H04L 69/40* (2013.01); *H04L 43/0882* (2013.01); *H04W 28/04* (2013.01); *H04W 76/028* (2013.01); *H04L 65/80* (2013.01)

(58) Field of Classification Search
USPC ....................................................... 379/32.01
See application file for complete search history.

(56) References Cited

U.S. PATENT DOCUMENTS 6,115,393 A     9/2000  Engel et al.
8,386,609 B2    2/2013  Anand et al.
(Continued)

FOREIGN PATENT DOCUMENTS

CN    1289516 A    3/2001
CN    1505418 A    6/2004
(Continued)

OTHER PUBLICATIONS

"International Search Report and Written Opinion", Application No. PCT/EP2011/064648, 11 pages.
(Continued)

*Primary Examiner* — Creighton Smith
(74) *Attorney, Agent, or Firm* — Sonia Cooper; Jim Ross; Micky Minhas

(57) ABSTRACT

Method and user terminal for handling a call over a communications network between a first user terminal, usable by a first user, and at least one other user terminal, usable by a respective at least one other user, wherein a client is executed at the first user terminal for participation in the call. The client determines a condition of a respective at least one network connection used in the call between the first user terminal and the at least one other user terminal over the communications network. The client also determines that the call has been dropped, and responsive to the determination that the call has been dropped, the client automatically attempts to re-establish the call in dependence upon the determined condition of the at least one network connection.

20 Claims, 11 Drawing Sheets

(51) Int. Cl.
*H04L 29/06* (2006.01)
*H04L 29/14* (2006.01)
*H04L 12/26* (2006.01)
*H04W 28/04* (2009.01)
*H04W 76/02* (2009.01)

(56) References Cited

U.S. PATENT DOCUMENTS

| | | |
|---|---|---|
| 8,548,125 B2 | 10/2013 | Liik et al. |
| 2002/0089451 A1 | 7/2002 | Wang et al. |
| 2005/0202849 A1 | 9/2005 | Ignatin |
| 2008/0120427 A1 | 5/2008 | Ramanathan et al. |
| 2009/0125589 A1 | 5/2009 | Anand et al. |
| 2010/0069060 A1 | 3/2010 | Katis et al. |
| 2011/0047219 A1 | 2/2011 | Tripathi et al. |
| 2011/0053586 A1 | 3/2011 | Snow et al. |
| 2011/0053588 A1 | 3/2011 | Al-Khudairi et al. |
| 2012/0057683 A1 | 3/2012 | Liik et al. |
| 2012/0327801 A1 | 12/2012 | Seo et al. |

FOREIGN PATENT DOCUMENTS

| | | |
|---|---|---|
| GB | 2327017 | 1/1999 |
| GB | 2339998 | 2/2000 |

OTHER PUBLICATIONS

"Non-Final Office Action", U.S. Appl. No. 13/073,596, (Jan. 28, 2013), 6 pages.

"Non-Final Office Action", U.S. Appl. No. 13/073,596, (Oct. 18, 2012), 4 pages.

"Notice of Allowance", U.S. Appl. No. 13/073,596, (May 29, 2013), 7 pages.

"Search Report", Application No. GB1014615.7, (Dec. 8, 2011), 1 page.

"Office Action and Search Report Received for Chinese Patent Application No. 201180042623.X", Mailed Date: Oct. 16, 2014, 23 Pages.

CALL RE-ESTABLISHMENT

RELATED APPLICATIONS

This application is a continuation of and claims priority to U.S. patent application Ser. No. 13/073,596, filed on Mar. 28, 2011 which claims priority to U.K. patent application Ser. No. 1014615.7, filed on Sep. 2, 2010, the disclosures of which are incorporated in their entirety by reference herein.

BACKGROUND

The present invention relates to call re-establishment. In particular, this invention relates to re-establishing a dropped call between two users over a communications network. Communication systems allow calls to be made between two or more user terminals over a communications network. As well as transmitting audio data over the communications network between the users in a call, video data can also be transmitted between the users in the call.

Calls can be one-to-one calls, meaning that just two users are involved in the call. In a one-to-one call, data streams representing the call data (e.g. audio data and video data) can be transmitted directly between the two users involved in the call. In some communication systems, each user may transmit data to and receive data from, a central server in the communications network. The central server may control the call.

Alternatively, calls can be group calls (or "multiparty" calls), meaning that more than two users are involved in the call. In group calls, one of the users may be designated as the host of the group call (the host user is often the user who has initiated the group call). Audio data streams from each user in the group call can be transmitted to the host user. The host user then mixes the audio streams and transmits a mixed audio data stream to each of the users in the group call, such that each user in the group call receives audio data from each of the other users in the group call. Where the call is a group video call, in order for each user of the group call to receive video data from each of the other users in the group call, each user can transmit a video data stream to a server and the server can then re-transmit the video streams to each of the users in the group call. The server, rather than the host user, distributes the video data streams to avoid placing a large bandwidth burden on the host user in the communications network. Video data streams usually comprise larger quantities of data than audio data streams.

In one example, the communication system is a packet-based communication system which allows the user of a device, such as a personal computer, to communicate across a communications network such as the Internet. Packet-based communication systems include voice over internet protocol ("VoIP") communication systems. These systems are beneficial to the user as they are often of significantly lower cost than fixed line or mobile networks. This may particularly be the case for long-distance communication. To use a VoIP system, the user must install and execute client software on their device. The client software provides the VoIP connections as well as other functions such as registration and authentication.

When a call is established, the establishment process involves transmitting control information between the users to authenticate each user to the other user(s) in the call, such that the call can be allowed to proceed. The call may proceed in a session in which a signalling channel is used to transmit control signals for the call. For example, when a call is established signalling information is transmitted between the users on a signalling channel. A call may be dropped when an active decision has been made to render it dropped. This active decision may be based on thresholds on different types of failure. For example, a call may be deemed dropped if no (e.g. voice) data is received for 15 seconds (the length of time before a call is deemed dropped may be configurable), or the timeout on a command delivery on the signalling channel occurs. Another trigger for determining that a call is dropped may be a specific signal received from a low level network stack, such as if Transmission Control Protocol (TCP) is used for signalling on the signalling channel and the OS notifies the client that the TCP session is dropped. In order for the call to be re-established, after it has been dropped, the users in the call will have to repeat the establishment process for re-establishing the call. At least one of the users in a dropped call can select to re-establish a call with the other users in the dropped call. When a particular user does select to re-establish a dropped call, each of the other users in the call will receive an incoming call request from that particular user and if they accept the call request then the call can be re-established.

As an example, a call may be dropped because one of the following conditions is true: a) no data stream has been received in the last 15 seconds; b) a command has been sent on a signalling channel that was not acknowledged within 40 seconds; or c) the signalling channel for the session was dropped. The signalling channel may be independent of the data streams on a logical level. However, the signalling channel is not necessarily independent from the data streams on a network level (e.g. the same User Datagram Protocol (UDP) or Transmission Control Protocol (TCP) connection may carry data and also signalling commands).

Calls may be dropped frequently. This is particularly true for users with poor network connections or at particular times when there is a large amount of data transmission on the communications network. It can be frustrating for a user when a call that he is participating in is dropped.

SUMMARY OF THE INVENTION

According to a first aspect of the invention there is provided a method of handling a call over a communications network between a first user terminal, usable by a first user, and at least one other user terminal, usable by a respective at least one other user, wherein a client is executed at the first user terminal for participation in the call, the method comprising: the client determining a condition of a respective at least one network connection used in the call between the first user terminal and the at least one other user terminal over the communications network; the client determining that the call has been dropped; responsive to the determination that the call has been dropped, the client automatically attempting to re-establish the call in dependence upon the determined condition of the at least one network connection.

According to a second aspect of the invention there is provided a user terminal, usable by a user, configured to handle a call over a communications network to at least one other user terminal, usable by a respective at least one other user, the user terminal comprising processing means configured to execute a client for participation in the call and to thereby: determine a condition of a respective at least one network connection used in the call between the user terminal and each of the at least one other user terminal over the communications network; determine that the call has been dropped; responsive to the determination that the call has been dropped, automatically attempt to re-establish the call in dependence upon the determined condition of the at least one network connection.

When a call is dropped, the communication session between the users in the call ends. The inventors have realised that it can be beneficial for the client executing at the first user terminal to automatically attempt to re-establish a call in response to the detection of a call drop. In this way the first user is not required to manually restart the call. This results in improved perceived call quality for the first user since the re-establishment of the call is transparent to the first user. Clients at both user terminals in the call may attempt to automatically re-establish the call.

Furthermore, the automatic attempt to re-establish the call is performed in dependence upon a determined condition of the network connections used in the call. In this way the client can determine whether to attempt to re-establish the call based on the particular current conditions on the network connections used in the call. For example, it may be determined that the first user terminal is connected with another user terminal over a network connection but that the network performance is not sufficient for handling audio or video aspects of the call. In that scenario the client may decide to terminate the call, such that the communication session ends, and then the client can attempt to re-establish the call. A newly re-established network connection may have a better quality than the previous network connection, such that at least one of the audio and video data streams may be able to be transmitted over the communications network in the re-established call. In another example, it may be determined that the first user terminal is connected with another user terminal over a network connection and that the network performance is sufficient for handling audio, but not video, aspects of the call. In that scenario the client may decide to terminate the call, such that the communication session ends, and then the client can attempt to re-establish the call. Alternatively, the client may decide to continue with only the audio aspects of the call.

In some embodiments all dropped call participants attempt to re-establish a dropped call for a predetermined time period (e.g. 60 seconds), independently from the network quality assessment. If a client is unsuccessful in re-establishing the call within the predetermine time period, re-establishment is considered unsuccessful and the call is finally terminated.

It can be seen that by attempting to re-establish the call in dependence upon the determined conditions on the network connections used in the call, a more flexible system results in which the re-establishment of calls can be adapted to suit the current network conditions.

The client may monitor the at least one network connection to detect an event indicative of a potential problem with the at least one network connection, wherein the step of determining a condition of a respective at least one network connection is initiated in response to said detection of an event indicative of a potential problem with the at least one network connection. The first user may be notified of the potential problem indicated by the detected event.

The first user may be informed of connection problems prior to a call drop and as such he would know that the connection is poor during re-establishment. Users are often more willing to accept lower levels of performance if they are aware of the cause of the low level of performance. Therefore, by notifying the user of potential problems with the network connections used in the call, the user has a greater perception of the call quality.

Each of the user terminals in the call may perform the steps of attempting to re-establish the call when the call is dropped. In a one-to-one call between the first user and another user both the client on the first user terminal and the client on the other user terminal may attempt to re-establish the call, and as such, each client will receive an incoming call request and transmit an outgoing call request. In this case each client may answer the incoming call request and merge the incoming call with the outgoing call request to thereby re-establish the call.

In group calls, the call re-establishment may be performed on a per-user basis, such that the first user attempts to re-establish the call with each of the users in the group call separately when it is determined that the group call has been dropped.

According to a third aspect of the invention there is provided a method of handling a call between a first user and at least one other user over a communications network, wherein a client is executed at a user terminal of the first user for participation in the call, the method comprising: the client determining that the call has been dropped; responsive to the determination that the call has been dropped, the client automatically attempting to re-establish the call.

According to a fourth aspect of the invention there is provided a method of handling a call between a first user terminal and at least one other user terminal over a communications network, wherein a client is executed at the first user terminal for participation in the call, the method comprising: the client determining that the call has been dropped; re-establishing the call between the first user terminal and the at least one other user terminal; the client storing user input data received from a user of the first user terminal in the time period after the call has been dropped and before the call has been re-established; responsive to the re-establishment of the call, the client transmitting the stored user input data to the at least one other user terminal in the call.

According to a fifth aspect of the invention there is provided a user terminal, usable by a user, configured to handle a call over a communications network between the user terminal and at least one other user terminal, usable by a respective at least one other user, the user terminal comprising processing means configured to execute a client for participation in the call and to thereby: determine that the call has been dropped; re-establish the call between the first user terminal and the at least one other user terminal; store user input data received from the user in the time period after the call has been dropped and before the call has been re-established; and responsive to the re-establishment of the call, transmit the stored user input data to the at least one other user terminal in the call.

The inventors have realised that it may be beneficial to record user input data during the time period between a call being dropped and the call being re-established. This recorded user input data can then be transmitted to the other user terminal(s) in the call when the call is re-established. In this way, user input data received at the first terminal whilst the call is dropped can be included in the re-established call. The user input data received whilst the call is dropped may be played out from a jitter buffer at the other user terminal at a rate that is faster than for normal user input data to thereby account for the time delay in receiving the data due to the dropping of the call. The user input data may be audio data or video data.

According to a sixth aspect of the invention there is provided a communications network configured to handle a call over the communications network between a user terminal according to the second or fifth aspect of the invention and at least one other user terminal.

The term "automatically" is used herein to mean "without user intervention".

BRIEF DESCRIPTION OF THE DRAWINGS

For a better understanding of the present invention and to show how the same may be put into effect, reference will now be made, by way of example, to the following drawings in which.

DETAILED DESCRIPTION

Preferred embodiments of the invention will now be described by way of example only. It will be apparent to a person skilled in the art that the invention is not limited by the specific features of the preferred embodiments described below. Various modifications may be made to the preferred embodiments described below without departing from the scope of the invention as would be apparent to a person skilled in the art.

Figure 1:
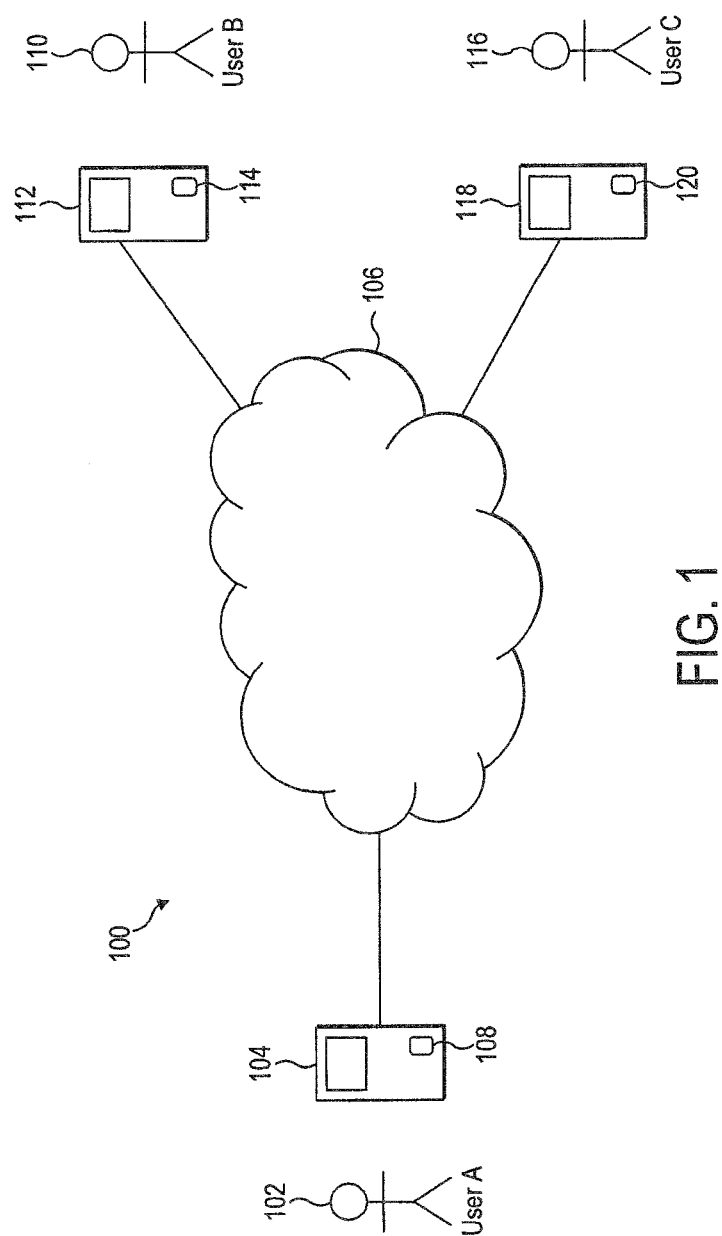
FIG. 1 shows a communications network according to a preferred embodiment.

Reference is first made to FIG. 1, which illustrates a packet-based P2P communication system 100 of a preferred embodiment. A first user of the communication system (User A 102) operates a user terminal 104, which is shown connected to a communications network 106. The communications network 100 may for example be the Internet. The user terminal 104 may be, for example, a mobile phone, a personal digital assistant ("PDA"), a personal computer ("PC") (including, for example, Windows™, Mac OS™ and Linux™ PCs), a gaming device or other embedded device able to connect to the network 106. The user device 104 is arranged to receive information from and output information to a user 102 of the device. In a preferred embodiment the user device 104 comprises a display such as a screen and an input device such as a keypad, joystick, touch-screen, keyboard, mouse, microphone and/or webcam. As shown in FIG. 1, the user device 104 is connected to the network 106.

Note that in alternative embodiments, the user terminal 104 can connect to the communication network 106 via additional intermediate networks not shown in FIG. 1. For example, if the user terminal 104 is a mobile device, then it can connect to the communication network 106 via a cellular mobile network (not shown in FIG. 1), for example a GSM or UMTS network.

The user terminal 104 is running a communication client 108, provided by the software provider associated with the communication system 100. The communication client 108 is a software program executed on a local processor in the user terminal 104 which allows the user terminal 104 to engage in calls over the network 106.

FIG. 1 also shows a second user 110 (User B) who has a user terminal 112 which executes a client 114 in order to communicate over the network 106 in the same way that the user terminal 104 executes the client 108 to communicate over the network 106. Similarly, FIG. 1 also shows a third user 116 (User C) who has a user terminal 118 which executes a client 120 in order to communicate over the network 106 in the same way that the user terminal 104 executes the client 108 to communicate over the network 106. Therefore the three users in the communication system 100 shown in FIG. 1 can communicate with each other over the communications network 106. There may be more users connected to the communications network 106, but for clarity only the three users 102, 110 and 116 are shown connected to the network 106 in FIG. 1.

Figure 2:
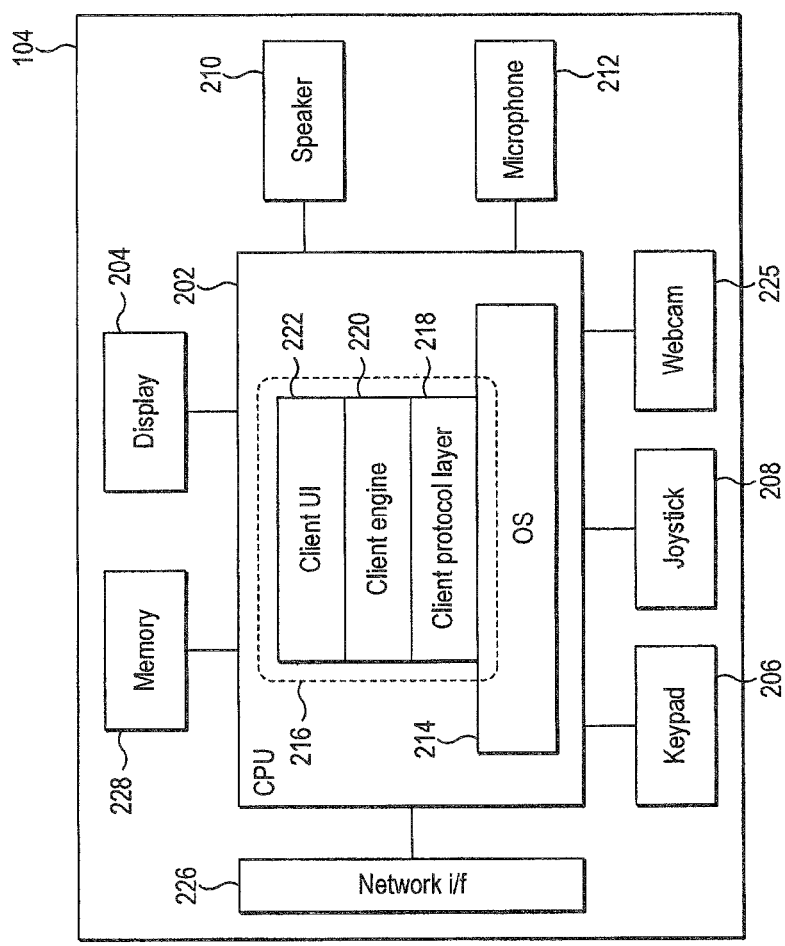
FIG. 2 shows a schematic diagram of a user terminal according to a preferred embodiment.

FIG. 2 illustrates a detailed view of the user terminal 104 on which is executed client 108. The user terminal 104 comprises a central processing unit ("CPU") 202, to which is connected a display 204 such as a screen, input devices such as a keypad (or a keyboard) 206, a pointing device such as a joystick (or mouse) 208 and a webcam 225 for capturing video data. The display 204 may comprise a touch screen for inputting data to the CPU 202. An output audio device 210 (e.g. a speaker) and an input audio device 212 (e.g. a microphone) are connected to the CPU 202. The display 204, keypad 206, joystick 208, webcam 225, output audio device 210 and input audio device 212 are integrated into the user terminal 104. In alternative user terminals one or more of the display 204, the keypad 206, the joystick 208, webcam 225, the output audio device 210 and the input audio device 212 may not be integrated into the user terminal 104 and may be connected to the CPU 202 via respective interfaces. One example of such an interface is a USB interface. The CPU 202 is connected to a network interface 226 such as a modem for communication with the communications network 106 for communicating over the communication system 100. The network interface 226 may be integrated into the user terminal 104 as shown in FIG. 2. In alternative user terminals the network interface 226 is not integrated into the user terminal 104.

FIG. 2 also illustrates an operating system ("OS") 214 executed on the CPU 202. Running on top of the OS 214 is a software stack 216 for the client. The software stack shows a client protocol layer 218, a client engine layer 220 and a client user interface layer ("UI") 222. Each layer is responsible for specific functions. Because each layer usually communicates with two other layers, they are regarded as being arranged in a stack as shown in FIG. 2. The operating system 214 manages the hardware resources of the computer and handles data being transmitted to and from the network via the network interface 226. The client protocol layer 218 of the client software communicates with the operating system 214 and manages the connections over the communication system 100. Processes requiring higher level processing are passed to the client engine layer 220. The client engine 220 also communicates with the client user interface layer 222. The client engine 220 may be arranged to control the client user interface layer 222 to present information to the user via a user interface of the client and to receive information from the user via the user interface.

Figures 3, 4:
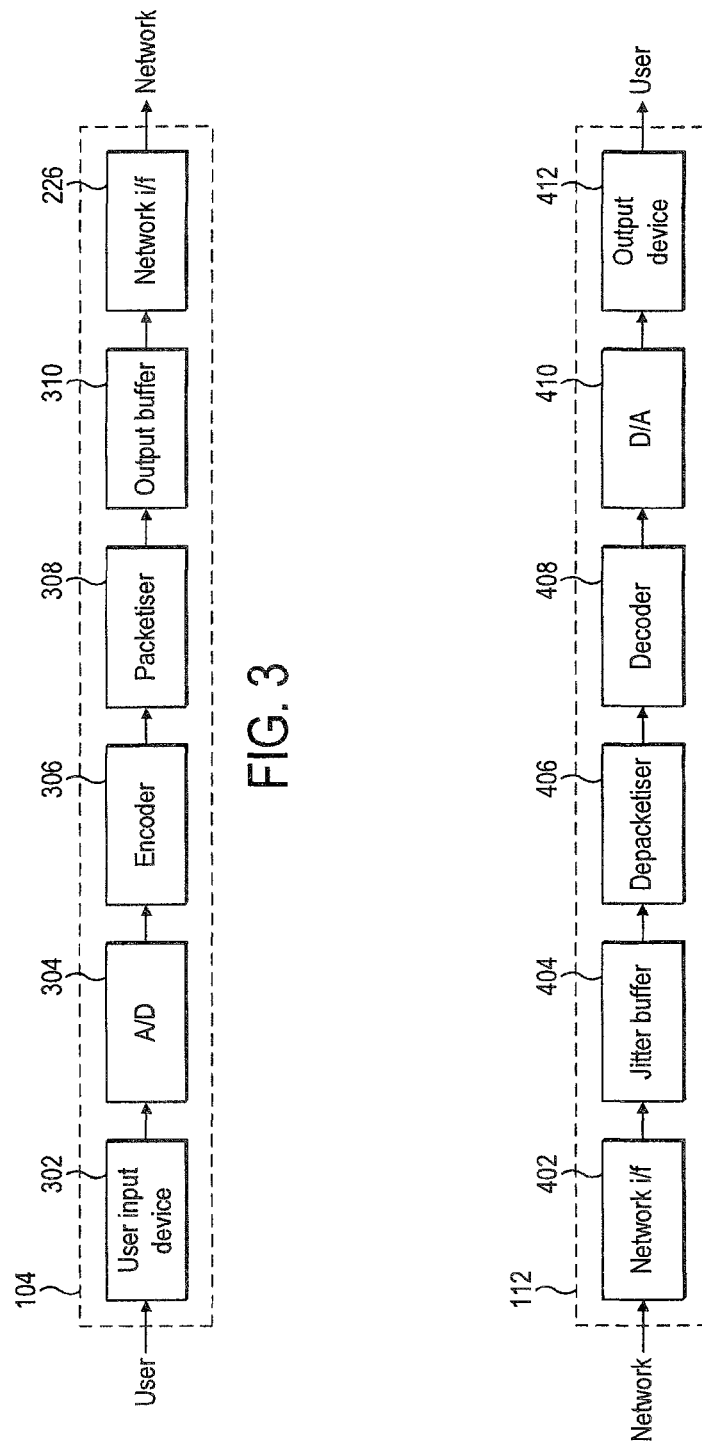
FIG. 3 shows a functional block diagram of a first user terminal according to a preferred embodiment.
FIG. 4 shows a functional block diagram of a second user terminal according to a preferred embodiment.

FIG. 3 is a representation of the user terminal 104 showing functional blocks in the user terminal 104 when the user terminal 104 is receiving user input data for use in a call over the communications network 106. The received user input data may be, for example, voice data or video data received at the user terminal 104 from the user 102. The user input data is processed using the functional blocks shown in FIG. 3 so that it can be transmitted over the communications network 106.

The user terminal 104 comprises a user input device 302 (such as the microphone 212), an analogue to digital converter block 304, an encoder block 306, a packetiser block 308, an output buffer 310 and the network interface 226. The user input device 302 is arranged to receive input data from the user 102. An output of the user input device 302 is coupled to an input of the analogue to digital converter block 304. An output of the analogue to digital converter block is coupled to an input of the encoder block 306. An output of the encoder block 306 is coupled to an input of the packetiser block 308. An output of the packetiser block 308 is coupled to an input of the output buffer 310. An output of the output buffer 310 is coupled to an input of the network interface 226. The network interface 226 is arranged to transmit data to the communications network 106. The user terminals 112 and 118 may also comprise equivalent functional blocks for transmitting data over the communications network 106.

The blocks 304 to 308 shown in FIG. 3 may be implemented as hardware in the terminal 104 or as software running on the CPU 202 in the user terminal 104. This is an implementation preference.

Following the initiation of a call, input data from the user 102 is input to the user input device 302, e.g. speech data is input into the microphone 212. The analogue to digital converter block 304 is arranged to convert the input speech signal into a digital signal. The digital signal output from the analogue to digital converter block 304 is input into the encoder block 306. The encoder block 306 encodes the signal. The encoder block 306 is arranged to output encoded data (e.g. arranged into frames) to the packetiser block 308. The packetiser block 308 inserts the encoded data frames into data packets. The data packets may comprise a header portion and a payload portion as is known in the art. The data packets are then queued for transmission in the output buffer 310 and transmitted from the user terminal 104 via the network interface 226, e.g. to the user terminal 112 over the network 106. The transmitted data packets constitute a data stream.

FIG. 4 is a representation of the user terminal 112 showing functional blocks in the user terminal 112 when the user terminal 112 is receiving call data from the network 106. The received data may be, for example, packetised audio or video data transmitted from the user terminal 104 over the communications network 106. The received data packets constitute a data stream which is processed using the functional blocks shown in FIG. 4 so that it can be output to the user 110 of the user terminal 112.

The user terminal 112 comprises a network interface 402, a jitter buffer 404, a depacketiser block 406, a decoder block 408, a digital to analogue converter block 410 and an output device 412, such as a speaker in the case that the data is audio data, or a screen in the case that the data is video data. The network interface is arranged to receive a data stream from the network 106. An output of the network interface 402 is coupled to an input of the jitter buffer 404. An output of the jitter buffer 404 is coupled to an input of the depacketiser block 406. An output of the depacketiser block 406 is coupled to an input of the decoder block 408. An output of the decoder block 408 is coupled to an input of the digital to analogue converter block 410. An output of the digital to analogue converter block 410 is coupled to an input of the output device 412. The output device 412 is arranged to output data to the user 110. For example, the output device 412 may be a speaker which outputs audio data, or the output device may be a screen which outputs video data. The user terminals 104 and 118 may also comprise equivalent functional blocks for receiving data over the communications network 106.

The blocks 406 to 410 shown in FIG. 4 may be implemented as hardware in the terminal 112 or as software running on a CPU in the user terminal 112. This is an implementation preference.

Data packets are received at the network interface 402 from the network 106 and the data packets pass to the jitter buffer 404 where the data packets are queued for a period of time before being output to the depacketiser block 406. The output rate at which the data packets are output from the jitter buffer 404 can be controlled to thereby control the output rate of received data. This can be particularly useful in order to smooth out jitter in a received data stream caused by different data packets of the data stream taking different amounts of time to be transmitted over the network 106. The de-packetiser block 406 is arranged to remove the encoded frames from the payload of the data packet. The encoded frames are then output from the de-packetiser block 406 and input into the decoder block 408. The decoder block 408 is arranged to decode the encoded frames and output a digital signal. The digital signal is then converted to an analogue signal by the digital to analogue converter block 410 and output to the user by the output device 412.

It can therefore be seen that using the functional blocks shown in FIGS. 3 and 4, the user terminals 104, 112 and 118 can engage in calls over the communications network 106

The methods described herein aim to improve a user's experience when a call is dropped. There are three general aims of preferred embodiments:

1) A first aim is to provide the user with an early notification of problems with a call. For example, if a call is ongoing, but there has been a four second gap a data stream used in the call. It is beneficial to inform the user about the gap because otherwise the user may not realise that there is a problem with the call before the call is actually terminated (e.g. in an audio call, a user may not necessarily notice gaps in the data stream). As another example, in cases where the available bandwidth is below a minimum bandwidth required for continuing with the call, the user is notified about the bandwidth problems. In this case the client might also provide assistance to the user, such as suggesting to the user that he turns off the video aspect of the call to reserve enough bandwidth to continue the call on an audio-only basis. Assistance might also be provided if the client detects that the user terminal is connected to the network using a wifi connection and the wifi signal on the wifi connection is weak. In that case the client might suggest that the user finds better coverage or switches to a cable connection. 2) A second aim is, once a call is dropped, to provide information to the user regarding where the problem has occurred which caused the call to be dropped. For example, the client may inform the user (e.g. using a dialogue box or an audible notification that "You are offline", or that "the other user is offline") 3) A third aim is to re-establish a dropped call. The call is re-established automatically, without requiring any user intervention.

In order to provide early Problem Notifications, a set of trigger points (or "trigger events") are used. A trigger point may be, for example, a four second gap on a data stream (the data stream may be transmitted or received from the user terminal), or a predefined amount time without receiving an acknowledgement of a command on a signalling channel used in the call. Once a trigger point is detected, the message is displayed to the user notifying him about the problem causing the trigger point, but not actually specifying the location where the problem is (e.g. whether there is a connection problem at the user's end or at the remote end of the call). At that point the client starts a sequence of Connectivity Tests. The reason for the connectivity tests is to locate the point where the problem is caused. As part of the connectivity tests, the client pings the user's own supernode (a third party node in the network which is local to the user) to determine if he has basic Internet connectivity, and if so the client pings the remote user in the call on a stream independent channel to determine if the remote user has basic internet connectivity. From the results of the connectivity tests the client can update the presence status for the local and the remote users in the call. The connectivity tests are a separate stage to the re-establishment stage. The re-establishment stage is initiated when it is determined that the call has been dropped.

If the call does not resume on its own before call drop criterions are met, then the client drops the call and enters the Call Recovery mode (i.e. the re-establishment stage). The user will be notified about the Recovery mode and will be provided with information on why the call was dropped, e.g. the client may notify the user that "You are offline" or that "the remote user is offline" or may display a generic error message if the exact reason for the call drop is unknown. In the Call Recovery mode the client attempts to re-establish the call for a predefined time (e.g. 60 seconds). Call recovery is attempted by both parties in a call, irrespective of which user was the initiator of the call.

If the Recovery is unsuccessful (i.e. the call cannot be re-established within the predefined time (e.g. 60 sec)) then the call is terminated and the client enters a Post Call state in which the reason for the call drop is displayed to the user, if known.

We will now describe each of the stages of the method in more detail. The methods described herein may be implemented in one-to-one and multiparty calls, which may be audio or video calls. The methods are performed during a call between users (e.g. users 102, 110 and 116) in the communication system 100. The method for re-establishing dropped calls in preferred embodiments includes three stages: (i) a Performance Trigger stage; (ii) a Connectivity Test stage; and (iii) a Recovery stage. Each stage will be discussed in turn below:

1) Performance Trigger Stage

In the performance trigger stage the user is alerted that a problem has been detected prior to the call being dropped. Also, in the performance trigger stage it is determined when the connectivity test needs to be conducted.

During a call, a call manager module of the client 108 of the user terminal 104 will monitor the network connections used in the call to detect any of the following events:

1. The loss of a data stream in the call. The loss of a data stream may be detected when the data stream (e.g. audio or video data stream) has not been transmitted or received over the network 106 for a predetermined time period. The predetermined time period may be, for example, four seconds. It should be noted that this predetermined time period is set to be less than the time period after which the call is dropped, which is described below. 2. A failure on a signalling channel used in the call. For example, if no acknowledgement of a signal command from the remote end of the call (e.g. user terminal 112) is received at the near end of the call (e.g. user terminal 104) within a predetermined time period (e.g. ten seconds). The signalling channel may be independent of the data streams on a logical level. However, the signalling channel is not necessarily independent from the data streams on a network level (e.g. the same UDP or TCP connection may carry data and also signalling commands). The acknowledgement of signal commands may be independent of stream loss. Another example of a failure on a signalling channel is when the TCP connection or the UDP connection used for signalling in the session in which the call is running is dropped. Other types of failure on signalling channels used in the call may also be detected. 3. The amount of bandwidth available on the network connections used in the call may fall to below a predetermined threshold bandwidth. A bandwidth manager at the user terminal 104 may monitor the bandwidth on the network connections used in the call and report the available bandwidth on the network channels used in the call to the client 108 such that the client can determine whether the available bandwidth has fallen below the threshold bandwidth.

The events (or "triggers") described above will be monitored independently for each participant in the call, i.e. for each user 102, 110 and 116 in the call. The parameter values used to define the performance envelope in which an acceptable call can operate may be updated remotely by transmitting update messages to the client 108. The parameter values are, for example, the time period for which a data stream can be lost before it is detected as a trigger event, the time period for which an acknowledgement can not be received before it is detected as a trigger event, and the predetermined threshold bandwidth described above. By varying these parameters the sensitivity of the client 108 to detecting adverse conditions as triggers (i.e. events indicative of poor network performance) can be adjusted.

Figure 5:
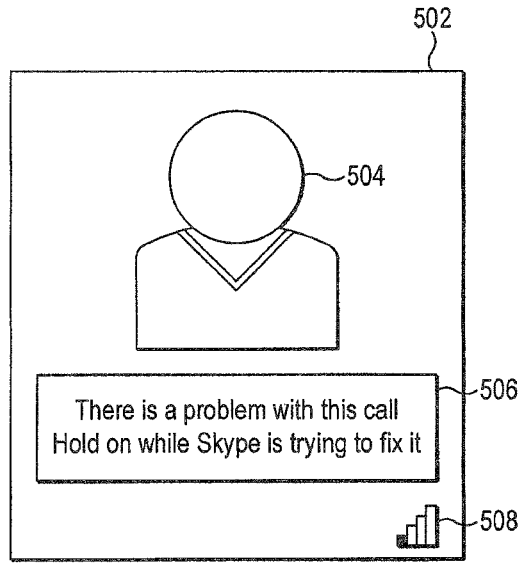
FIG. 5 is a representation of a user interface displayed to the first user when the client has detected a problem according to a preferred embodiment.

Once a performance trigger is detected, the affected user (e.g. user 102), may be notified of the potential problem that caused the trigger to be detected. For example, the client 108 can notify the user 102 of the problem via a dialogue box displayed on the display 204 of the user terminal 104. FIG. 5 shows an example of a user interface 502 of the client 108 which is displayed to the user 102 on the display 204. FIG. 5 shows an example user interface 502 displayed when the user 102 is in a one-to-one call with the user 110 over the network 106. The user interface 502 shows video data received from the user 112 in a pane 504. When a problem has been detected with a network connection between the user terminal 104 and the user terminal 112 over the network 106 the dialogue box 506 is displayed in the user interface 502. FIG. 5 shows the dialogue box 506 notifying the user that there is a problem with the call, and asking the user 102 to hold on while Skype is trying to fix it. In the lower right hand corner of the user interface 502 there is shown a network call quality indicator 508 which may notify the user that there is a problem with the network connection used in the call. In the example shown in FIG. 5, the network call quality indicator 508 indicates that the network call quality is at a level of one out of four, which indicates to the user 102 that there is a problem with the network connection used in the call.

In addition to displaying notifications of detected network problems on the user interface 502, an audible notification may be output to the user 102, e.g. using the speaker 210 of the user terminal 104.

By notifying the user 102 that the client 108 has detected a potential problem on the network the user 102 is prepared for a drop in the call quality. This can reduce any frustration caused to the user 102 if the call does drop or if the quality of the call does fall to an unacceptable level. Since the events that are detected in the performance trigger stage are events indicative of problems on the network but are not events which cause the call to be dropped, the notification to the user 102 of the problems on the network described above occurs prior to a drop of a call. This allows the user 102 to prepare for a forthcoming drop in the call.

Figure 8:
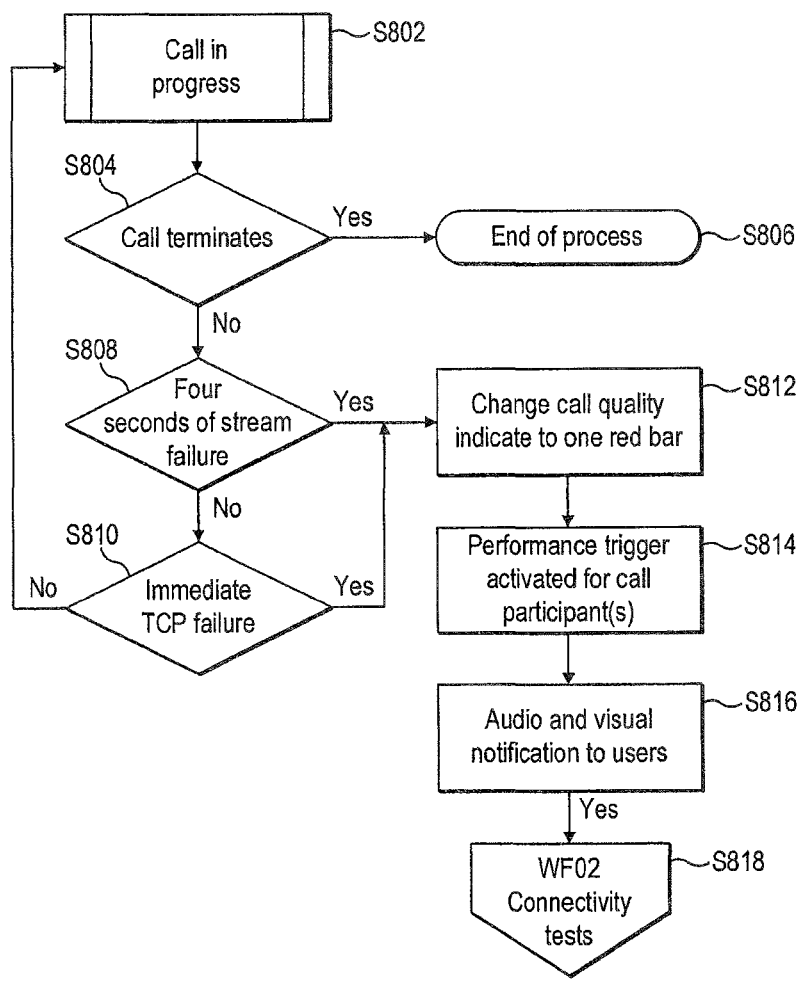
FIG. 8 is a flow chart for a process of detecting an event indicative of a potential problem with a network connection according to a preferred embodiment.

FIG. 8 shows a flow chart for a process of detecting an event indicative of a potential problem with a network connection according to a preferred embodiment. The process begins in step S802 in which a call is in progress. As in the example described above, the call may be a one-to-one video call between users 102 and 110 over the network 106. In step S804 it is determined whether the call has been terminated. If the call has been terminated then the process shown in FIG. 8 ends in step S806. However, if the call has not been terminated then the method passes to step S808 in which it is determined whether a data stream used in the call has been lost for at least four seconds. As described above, if a data stream has been lost for at least four seconds then this is detected as an event indicative of problems on the network which should be notified to the user 102. However, if the data stream used in the call has not been lost for at least four seconds then the method passes to step S810 in which it is determined whether there is a failure on the TCP connection. In step S810 it might also be determined whether there is a failure on any other signalling channel used in the call, e.g. on a UDP connection. If there is no such failure on a stream independent signalling channel, then it is determined that there are no problems with the network connections used in the call that the user 102 should be notified of and so the method passes back to step S802 and the call continues.

However, if in step S808 it is determined that a data stream has been lost for at least four seconds, or if in step S810 it is determined that there is a failure on a stream independent signalling channel then the method passes to step S812 in which the network call quality indicator 508 shown in the user interface 502 of the client 108 is changed to indicate one red bar. In this way the user 102 is notified of the potential problem with the call. Then in step S814 the client 108 detects the event (i.e. the stream failure for more than four seconds or the failure on the stream independent signalling channel) as a performance trigger and then in step S816 the user 102 may be further notified of the potential problem. This further notification may be an audio and/or visual notification as described above. The visual notification may be provided using the dialogue box 506 as described above, and the audio notification may be provided using the speaker 210 of the user terminal 104 as described above. Since the performance trigger has been detected in step S814, in step S818 the method will pass to the connectivity test stage, which is described in more detail below. In particular, the method may pass to step S902 shown in FIG. 9 which is described in more detail below.

2) Connectivity Test Phase

During the connectivity test phase, a connectivity test module of the client 108 diagnoses the problem with the network connection that has been detected by the performance trigger. The result of the connectivity test is output to the user 102. This informs the user of the problem and allows the user to take corrective action where possible.

When at least one trigger is detected, the connectivity test module of the client for each affected participant will diagnose the internet connection. For example, the connectivity test module of the client 108 will first check the local connection of the user terminal 104 by sending a message to a local third party node in the network 106. In this way the user terminal 104 checks whether it can connect to the network 106. In order to perform this check, the user terminal 104 sends a probe signal (e.g. a TCP and/or UDP signal) to the local third party node (which may for example, be a supernode or a server in the network 106 which is local to the user terminal 104 in the network 106). If a probe acknowledgement signal is received in response to transmitting the probe signal to the local third party node within a given time limit, then the client 108 concludes that the user terminal can connect to the network 106. For example, the client 108 may determine that it has (at least basic) Internet connectivity, and may determine for which protocol it has connectivity (e.g. for TCP and/or UDP). If a probe acknowledgment signal is not received within the given time limit then the client 108 determines that it cannot connect to the network 106 and that this is the cause of the problem which was detected by the trigger. A presence status of the user 102 in the network 106 may be updated accordingly (e.g. the user's presence status may be set to OFFLINE) when it is determined that it is not connected to the network 106. If a call then goes into a re-establishment stage, as described in more detail below, then the user 102 may be notified that the call is in the re-establishment stage because the user terminal 104 does not have internet connectivity.

In addition, from the round trip time (RTT) of the probe signal to and from the local third party node, the client 108 can get an indication of the quality of the network connection that the user terminal 104 has with the network 106. For example, if the RTT of the probe signal is <1000 ms then it may be determined that the connection of the user terminal 104 to the network 106 is OK, if the RTT of the probe signal is between 1000 and 2000 ms then it may be determined that the connection of the user terminal 104 to the network 106 is POOR, and if the RTT of the probe signal is >2000 ms then it may be determined that the connection of the user terminal 104 to the network 106 is CRITICAL. The indication of the quality of the network connection between the user terminal 104 and the network 106 can be used for informing the user 102 of the cause of a network problem.

The connectivity test module of the client 108 will then test the connectivity of the far end of the call (e.g. the connection of the user terminal 112) by transmitting a message to the user terminal 112 via a separate channel. In this way the client 108 can determine if a problem with a call is caused by the network connection of another user terminal (e.g. user terminal 112) with the network 106. This test can be performed in the same way as described above for the local connectivity test. In other words, if the client 108 has determined that it can connect to the network 106 without any problems then the client 108 can send a probe signal to the other user terminal 112. If a probe acknowledgement signal is not returned within a given time limit, then the client 108 can determine that the other user terminal (e.g. user terminal 112) has a problem connecting to the network 106. In that case the presence status of the user 110 is updated (e.g. set to OFFLINE) to reflect the problems that the user terminal 112 is having connecting to the network 106. If a call then goes into a re-establishment stage, as described in more detail below, then the user 102 may be notified that the call is in the re-establishment stage because the other user 110 seems to be OFFLINE.

If the host of a group call decides to terminate the call during the connectivity test stage (regardless of whether they are subject to the tests), then the process will halt completely and the call will be terminated. However, if another user in the call attempts to terminate the call during the connectivity test stage then the host user may attempt to re-establish the call to that user, and to each of the other users in the group call, regardless. It should be appreciated that the host will attempt to re-establish a connection to each call participant in a group call individually.

If the user terminal 104 is unable to connect to the network 106, then the client 108 will only be able to report on user 102's status, and not on the connectivity status of other participants in the call. In other words the client 108 cannot determine the connectivity status of the other users in a call when the user terminal 104 cannot connect to the network 106.

The connectivity tests will be deemed to be successful if a call can continue with at least one other user in a call. For example, if the call is a one-to-one call, the connectivity test is deemed to be successful if a low level connection can be made between the two participants of the call. In another example, if the call is a group call, the client 108 will determine that the connectivity test is successful if a low level connection can be made between the user terminal 104 and at least one other user terminal in the original group call. If a connection can only be made between the user terminal 104 and one other user terminal (e.g. user terminal 112) then a former group call can be recovered to a one to one call. This shows that in a group call the connectivity of the network connection to each of the other users in the group call is tested separately.

If the connectivity tests are successful, and the call has been dropped then the client 108 will attempt to re-establish the call by any technical means possible as part of the Recovery Mode as described below.

The former availability status of user 110 will be restored when the call is successfully re-established. For example, if the user 112 was set to 'Away' during the call, then changed to 'Offline' during a failure in the network connectivity of the user terminal 112, the status will be reverted to 'Away' on successful re-establishment of the call. When a call is re-established, the Network Call Quality Indicator 508 will be re-assessed for all users in the call and updated accordingly.

At the conclusion of the Connectivity tests, the presence status in the communications network for each user in the call is updated. Each participant user on the call will be in one of four possible states:

1. State #1—the user is connected with at least one other participant in the call and their network performance is satisfactory. In this case the connectivity test is deemed to be successful and the available bandwidth on the network connections used in the call (determined by the bandwidth manager) is above a predetermined upper threshold which is required for acceptable transmission of both audio and video data streams in the call. 2. State #2—the user is connected with at least one other participant in the call, but their network performance is too poor to handle all aspects of the call. State #2 is split into two sub-categories: [0077] State #2a—the network performance is too poor to continue video aspects of the call, but the audio aspect of the call is able to proceed. In this case the connectivity test is successful and the available bandwidth on the network connections used in the call is below the upper threshold required for acceptable transmission of video data streams, but above a lower threshold required for transmission of audio data streams. [0078] State #2b—the network performance is too poor to continue the call at all—in this case the connectivity test is successful but the bandwidth is below the lower threshold, such that neither video nor audio data streams can be transmitted with an acceptable bandwidth in the call. 3. State #3—the user terminal 104 cannot connect to the network 106. In other words, the local network connection is unavailable. In this state the client 108 does not acquire any information about the connectivity of the other participants in the call. 4. State #4—the user terminal 104 is connected to the network 106, i.e. the user terminal 104 has a local connection, but no other participant in the call is connected to the network 106.

The details available to the client 108 on the connectivity status of the remote users in the call will be subject to the accuracy of the data available and will be as accurate as the network information available.

As described above, each user in the call may perform the connectivity tests such that each user determines which state they are in. If all the participants in a call are in state #1, the call returns to normal and all recovery UI elements will disappear. In this case there is no problem with the call and the call is not dropped.

If any participants in the call are in state #2a then those affected users will be advised that, so far as they are concerned, the call can continue on an audio-only basis and the video aspect of the call will be halted to allow the call to proceed on an audio-only basis. Other participants in the call who are in state #1 may continue with both the video and audio aspects of the call.

A user in state #2a may be provided with the options of continuing with the call on an audio-only basis or attempting to re-establish the video aspects of the call or terminating the call. These options may be provided via a dialogue box on the display of the user terminal. Where the user decides to continue with the call on an audio-only basis a complete re-establishment process (i.e. terminate and redial) may not be necessary, and the client can return to the pre-problem trigger stage, whilst the call continues.

If any participants are in state #2b the status of the participant in the call will be updated. If the call is dropped as a result of the low available bandwidth on the network then the call will be re-established as part of the Recovery stage as described in more detail below.

If any participant is in state #3 or #4, the connectivity tests may be repeated. There will be no limit on the number of connectivity attempts, but there will be a maximum time that the tests are to be conducted (the maximum time limit will be a configurable parameter).

If the connectivity tests are not successful after the maximum time period, in one embodiment of the invention the process will advance to a Post Call stage (described below). In an alternative embodiment of the invention the client 108 will determine whether the call has been dropped due to the connectivity problems and, if so, will attempt to re-establish the call rather than proceed to the Post Call stage. The connectivity tests will all be performed client-side, separately for each call participant.

Figure 9:
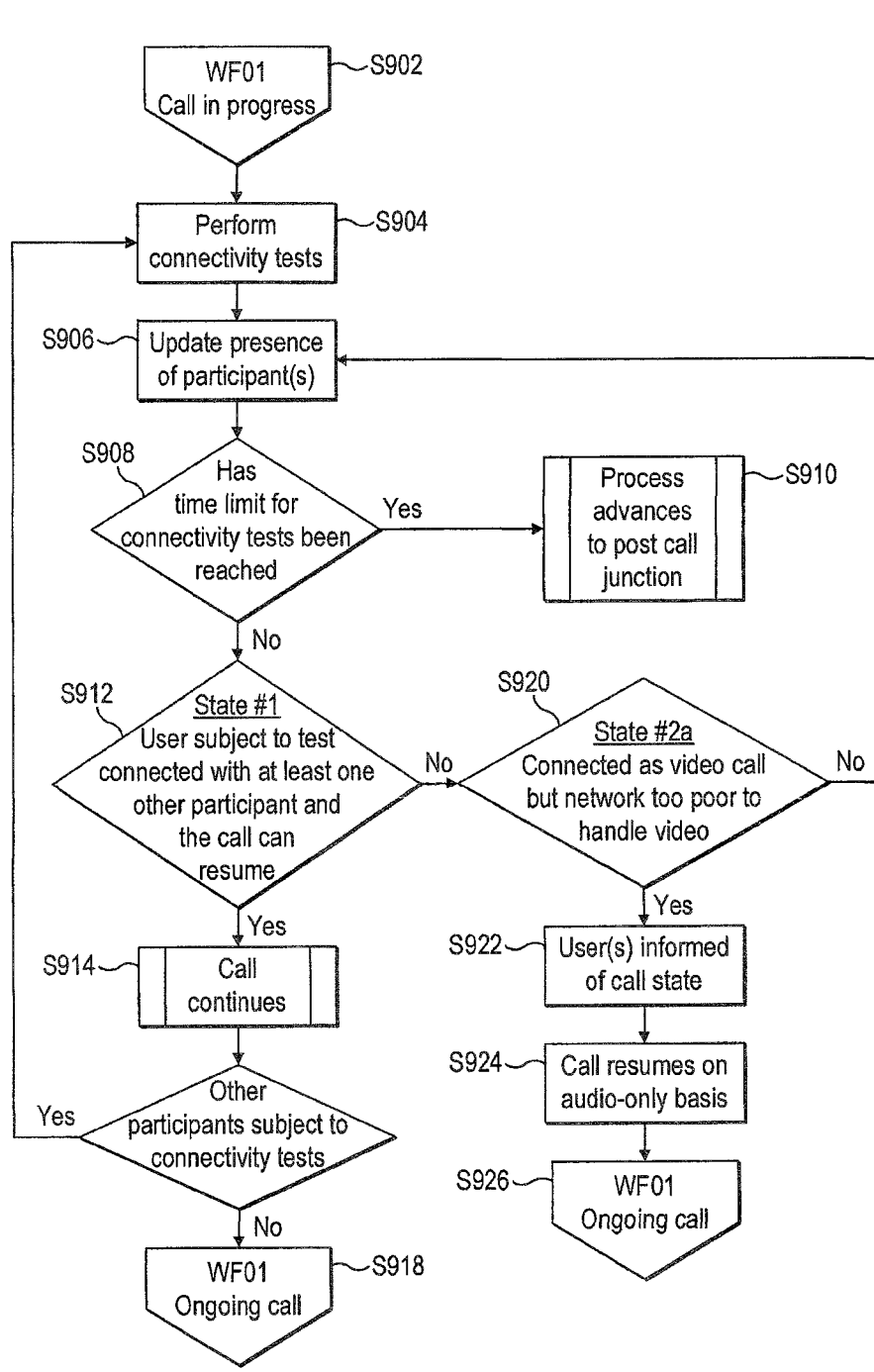
FIG. 9 is a flow chart for a process of performing connectivity tests according to a preferred embodiment.
Figure 9:
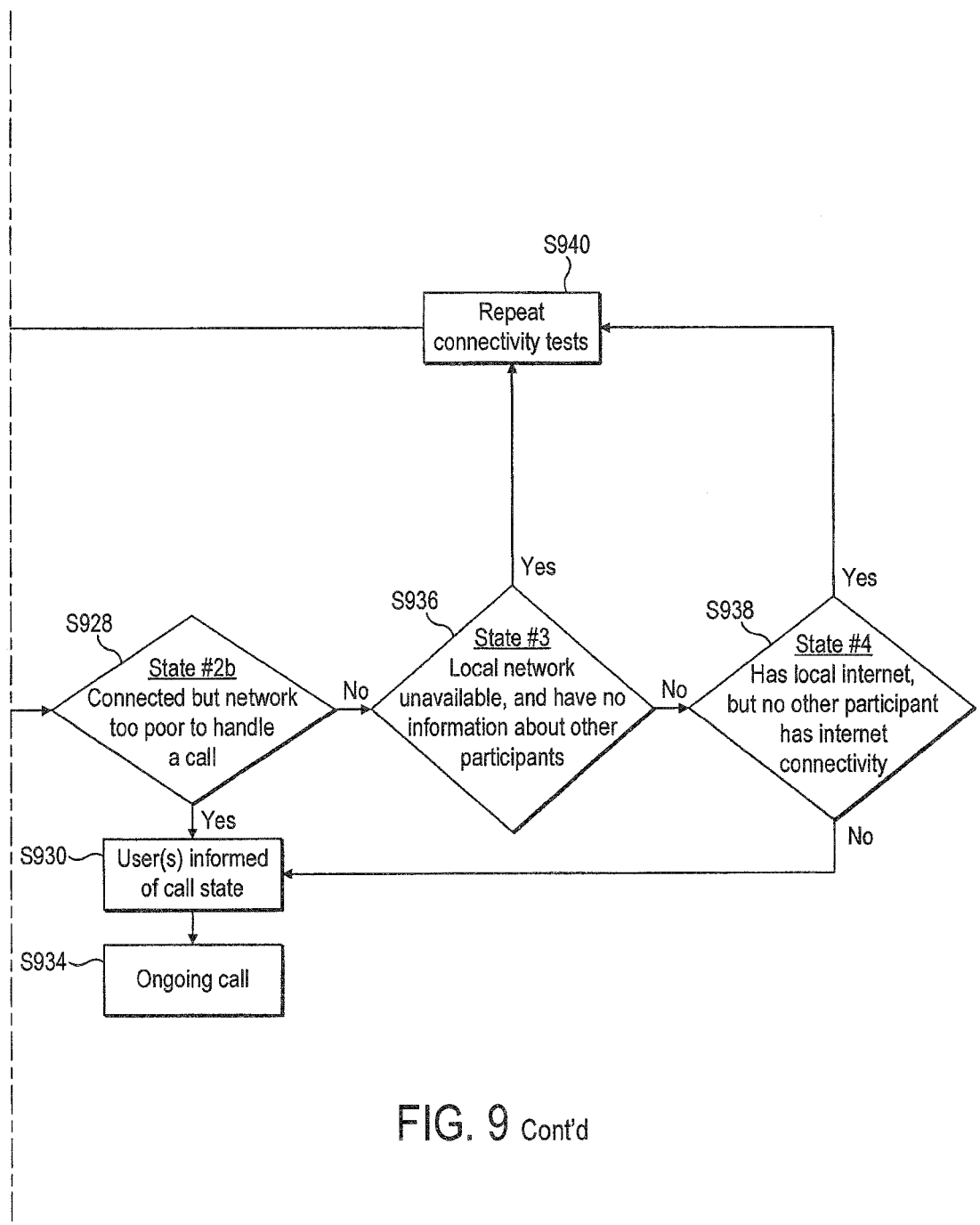

FIG. 9 is a flow chart for a process of performing connectivity tests according to a preferred embodiment, which summarises the description above relating to the connectivity test stage. The method of FIG. 9 starts with step S902 which follows on from the Trigger detection method of FIG. 8 as described above. The method passes to step S904 in which the connectivity tests are performed as described above, such that the client 108 determines the extent to which each user in the call is connected to the network 106. In step S906 the presence status of the users in the call is updated to reflect the results of the connectivity testing performed in step S904. By updating the presence status of the users in the call, the user 102 is informed of the connectivity status of each of the users in the call. It should be noted that if the user terminal 104 cannot connect to the network 106 then the client 108 cannot determine the presence status of the other users in the call, as described above.

The method then passes to step S908 in which it is determined whether a time limit for performing the connectivity testing has been reached. If this time limit has been reached then the method passes to step S910 in which the process proceeds to the post call state, which is described in more detail below. However, if in step S908 it is determined that the time limit has not been reached then the method passes to step S912 in which it is determined whether the user terminal 104 is in state #1. If it is determined that the user terminal 104 is in state #1 then the method passes to step S914 in which the call continues because the user terminal 104 is connected and has sufficient bandwidth for participating in all aspects of the call. Then in step S916 it is determined whether any of the other participants in the call are subject to connectivity tests, and if so then the method passes back to step S904 for further connectivity tests to be performed. However, if no other participants in the call are subject to connectivity tests then the call continues and in step S918 the method passes back to step S802 shown in FIG. 8 in order to detect any subsequent trigger events.

Returning to step S912, if it is determined that the user terminal 104 is not in state #1 then the method passes to step S920 in which it is determined whether the user terminal 104 is in state #2a. If the user terminal 104 is in state #2a then in step S922 the user is informed of the call state and that the call can only proceed on the basis of an audio-only call. The user may be presented with the options of continuing with the audio-only call, terminating the call or attempting to re-establish all aspects of the call. In the example shown in FIG. 9 the method proceeds in step S924 by resuming the call on an audio-only basis, and in step S926 the method passes back to step S802 shown in FIG. 8 in order to detect any subsequent trigger events.

Returning to step S920, if it is determined that the user terminal 104 is not in state #2a then the method proceeds to step S928 in which it is determined whether the user terminal 104 is in state #2b. If the user terminal 104 is in state #2b then the method passes to step S930 in which the user 102 is notified of the call state, i.e. that the user terminal 104 is connected to the network 106, but the network performance is to poor to continue with the call, either as a video call or as an audio call. Then in step S934 the call continues until a condition for rendering the call dropped has occurred.

Returning to step S928, if it is determined that the user terminal is not in state #2b then the method passes to step S936 in which it is determined whether the user terminal 104 is in state #3. If the user terminal 104 is in state #3 then the method passes to step S940 in which the connectivity tests are repeated, such that the method passes back to step S906. However, if it is determined in step S936 that the user terminal 104 is not in state #3 then the method passes to step S938 in which it is determined whether the user terminal is in state #4. If it is determined that the user terminal 104 is in state #4 then the method passes to step S940, to thereby repeat the connectivity tests. This cycle of repeating the connectivity tests will continue until either the time limit used in step S908 expires or it is determined in the connectivity tests that the user terminal 104 is no longer in state #3 or #4.

If it is determined in step S938 that the user terminal 104 is not in state #4 then the method passes to step S930 as described above such that the user is informed that the user terminal is in state #4 and in step S934 the call continues until a condition for rendering the call dropped has occurred as described in more detail below.

3) Recovery Stage (or "Re-Establishment Stage")

Re-establishment of a call involves termination of the current call (if it has not yet been terminated) and then initiation of a new call with the participants of the dropped call. References to dropping a call in this document refer to an active decision to render a call dropped. By terminating the call, the client drops the call such that it can be re-established afresh.

Termination of the call will occur (i.e. a call will be rendered "dropped") in the following circumstances:

1. When the period of data stream loss (in either direction) exceeds a predetermined period of time (e.g. 15 seconds) then the call manger will terminate the call. The data stream may be a video data stream or an audio data stream. When a data stream is lost for more than 15 seconds then the client 108 terminates the call such that it can be re-established, rather than waiting any longer for transmission of the data stream to be resumed. It should be noted that the performance trigger uses a time period of four seconds, i.e. a time period which is less than that after which it is determined that the call is to be dropped. 2. When a command on a signalling channel is not acknowledged from the remote end of the call within a predetermined period, e.g. 20-40 seconds then the call will drop. This may be independent of stream loss. It may occur without a stream loss or at the same time as a stream loss (in which case the stream loss timeout would usually happen first, causing the call to be dropped).

Figure 6:
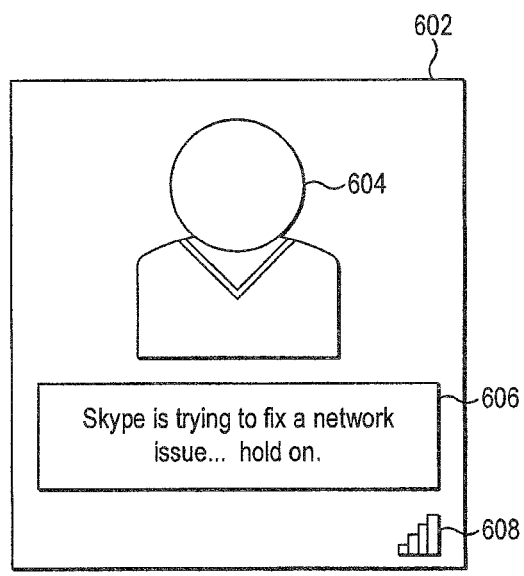
FIG. 6 is a representation of a user interface displayed to the first user when the client is attempting to re-establish a call according to a preferred embodiment.

If the call is dropped the call manager will attempt to re-establish the call by automatically requesting a new connection between the users in the call. In one embodiment of the invention the call manager will attempt to re-establish all dropped calls. In an alternative embodiment of the invention the call manager will only attempt to re-establish a call if the user terminal 104 is in state #2b. FIG. 6 illustrates a representation of the appearance of a user interface 602 of the client 108 while the re-establishment of a call is occurring. The user interface 602 has a pane 604 which shows the last received video data from the remote user in the call and a dialogue box 606 which informs the user 102 that the client 108 is trying to fix a network problem. By informing the user 102 that there is a problem and that the client 108 is attempting to fix the problem, the user's perception of the call quality is improved relative to a situation in which a call is simply dropped. User interface 602 also shows a network call quality indicator 608 which shows that there is currently no connectivity between the users in the call.

In the case where the near end and far end clients (e.g. clients 108 and 114) in a call are both in the re-establishment stage, both the far end client and the near end client will attempt to re-establish the call. As such, each client will receive an incoming call request and transmit an outgoing call request. In this case each client will answer the incoming call request and merge the incoming call with the out going call request in order to re-establish the call.

Advantageously, the call re-establishment occurs automatically (i.e. without user intervention). Furthermore, during the call re-establishment stage, the process itself will be invisible to users.

Where possible, each user in the call will be informed of issues that affected other call participants (e.g. by displaying in a dialogue box on a user interface of the client 108 that 'user x is not connected').

Upon successful re-establishment of a dropped call, the user terminals in the re-established call may be in state #1, in which case the call will continue until another performance trigger event is detected.

Users will not be able to cancel the initiation of a call re-establishment other than by terminating the call.

There will be a time limit of x seconds (where a default value of x may be 45, but this is be a configurable parameter of the system) for the call to be re-established. If the call is not re-established within the time limit, the process will advance to the Post Call state which is described below.

If the call re-establishment is successful, the call participants will not need to take any further action and the call can continue. This makes the methods particularly advantageous, since the user is not required to perform any actions whatsoever, and if the call re-establishment process succeeds then the call can continue.

For legacy versions of the client that are not arranged to automatically answer a re-establishment call setup request, these versions of the client will experience re-establishment as a new incoming call. Similarly, re-establishment call set up requests to land lines will be seen as new incoming calls. This allows the re-establishment methods to be performed even when some of the user terminals in the call implement older, or different, techniques which may not be aware of the re-establishment process implemented by client 108.

If there is a failure for a participant during the initiation of the re-establishment process, the re-establishment process will be halted for that participant and the process will advance to the Post Call state.

If an attempt to re-establish the call over the communications network 106 fails then the client 108 may proceed to attempt to establish a connection with the user 112 over a different communications network. For example, in one embodiment of the invention, the communications system 100 is the Skype communication system and the communications network 106 is the Internet. If the attempt to re-establish the call over the Skype system 100 fails then Non Skype numbers on a users profile may be used to re-establish the call. The non-skype numbers may be, for example, PSTN numbers or numbers in a mobile communications system.

In one embodiment of the invention if a call that was formerly a video call is re-established, it will be re-established as audio call. This may be dependent on whether there was limited bandwidth available to make a video call (e.g. if the user terminal is determined to be in state #2b following the connectivity tests). Users will be free to manually convert the call back to a video call if they wish upon re-establishment.

Figure 10:
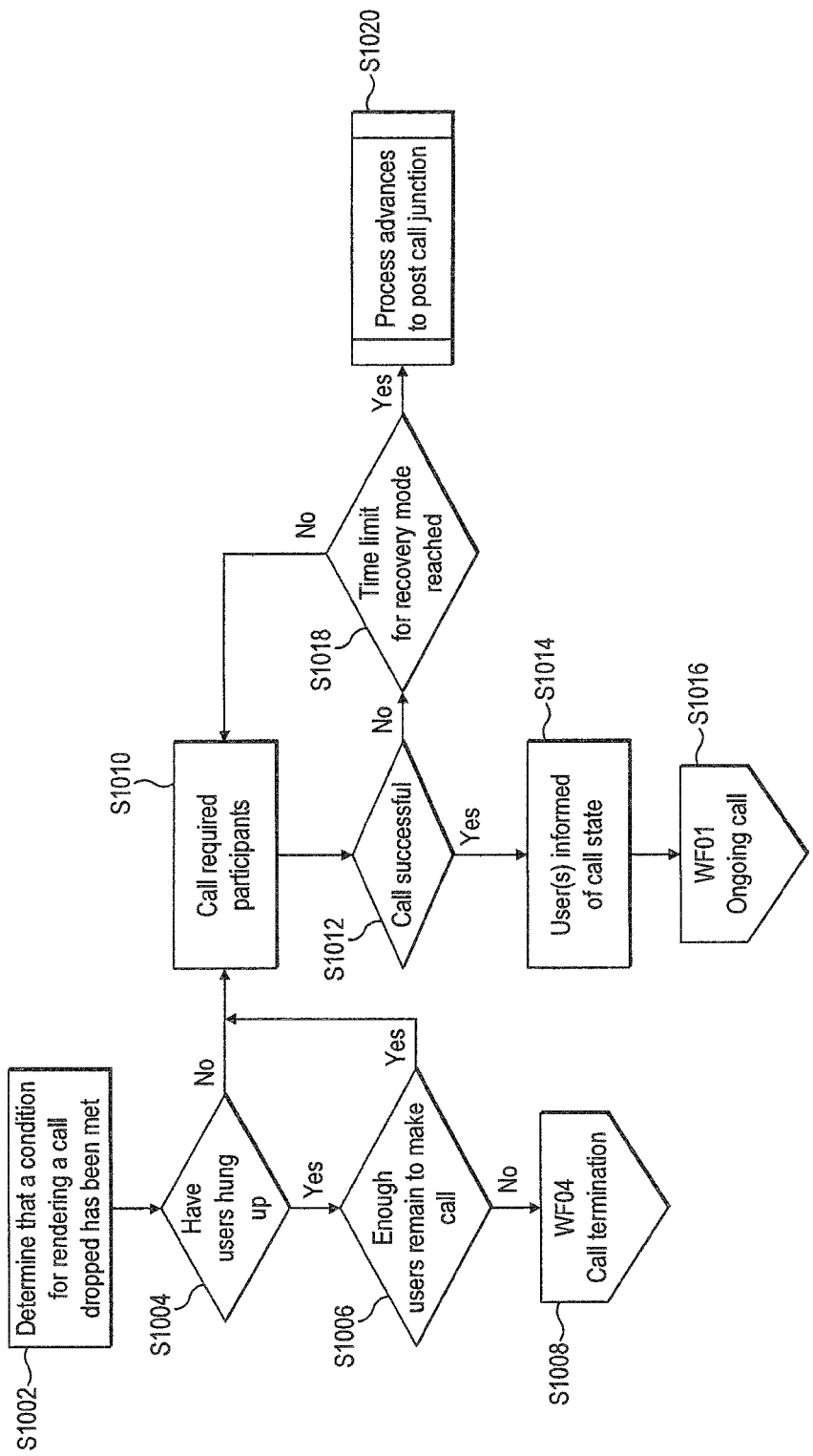
FIG. 10 is a flow chart for a process of re-establishing a dropped call according to a preferred embodiment.

FIG. 10 is a flow chart for a process of re-establishing a dropped call. The re-establishment process shown in FIG. 10 starts with step S1002 in which it is determined that a condition for rendering the call "dropped" has occurred. The method passes to step S1004 in which it is determined whether any users in the call have hung up, i.e. terminated their participating in the call. If none of the users in the call have hung up then the method passes to step S1010. However, if some users in the call have hung up then the method passes to step S1006 in which it is determined whether there are enough users remaining in the call to re-establish the call. If there are not enough users remaining in the call to establish the call then the method passes to step S1008 in which the call is terminated and the method passes to step S1102 shown in FIG. 11 and described in more detail below. However, if in step S1006 it is determined that there are enough users remaining in the call to establish the call then the method passes to step S1010.

In step S1010 the client 108 calls the users remaining in the call. In step S1012 the client 108 determines whether the call is successful. When the call is successful, the call is established to at least one other user. If the call is successful then the method passes to step S1014 in which the users in the call are informed of the successful call state and in step 1016 the call continues and the method passes back to step S802 shown in FIG. 8 such that the client 108 monitors the network connections used in the call to detect any subsequent performance trigger events as described above.

If it is determined in step S1012 that the call attempt has not been successful then the method passes to step S1018 in which it is determined whether the time limit for re-establishing the call has been reached. If the time limit has not yet been reached then the method passes back to step S1010 such that the participants in the call are called again, in another attempt to re-establish the call. In this way the client 108 repeatedly attempts to re-establish the call until the call attempt is successful or the time limit in step S1018 is reached.

If it is determined in step S1018 that the time limit for re-establishment of the call has been reached then the method passes to step S1020 in which the attempts to re-establish the call are ceased and the method passes to the post call state.

Post Call State

The user terminal 104 is in the post call state when the call has been terminated and the attempts to re-establish are not being performed.

Where a one to one call has terminated due to no participants being online, the user 102 will be offered the following options:

1. The user 102 can be alerted when the other user (e.g. user 110) in the terminated call next appears online. This may be a configurable setting. The notification will be relevant only for a predetermined time after the termination of the call e.g. 1 hour (i.e. if the remote user is online two hours after the dropped call, the local user will not be notified). If the dropped call was a group call, the local user may be notified of each former participants' online resumption separately. The notification will override notification settings of the local user where they have indicated they do not wish to be notified when a contact is online. 2. The user terminal 104 may immediately redial the call using the communication system 100. 3. The user terminal 104 may redial the call as a SkypeOut call (i.e. using a different communication system to communication system 100) if the other user(s) in the call has a phone number in their profile and the user 102 has credit sufficient for dialling numbers outside of the communication system 100. 4. The user 102 may be provided with the option of topping up their account and then manually attempting the call as a SkypeOut call if the remote user has a phone number in their profile but the local user (i.e. user 102) has no credit. 5. The user 102 may populate the remote user's phone numbers if the remote user does not have a phone number in their profile but the local user has credit, thereby allowing the user 102 to call the remote user as a SkypeOut call.

Figure 7:
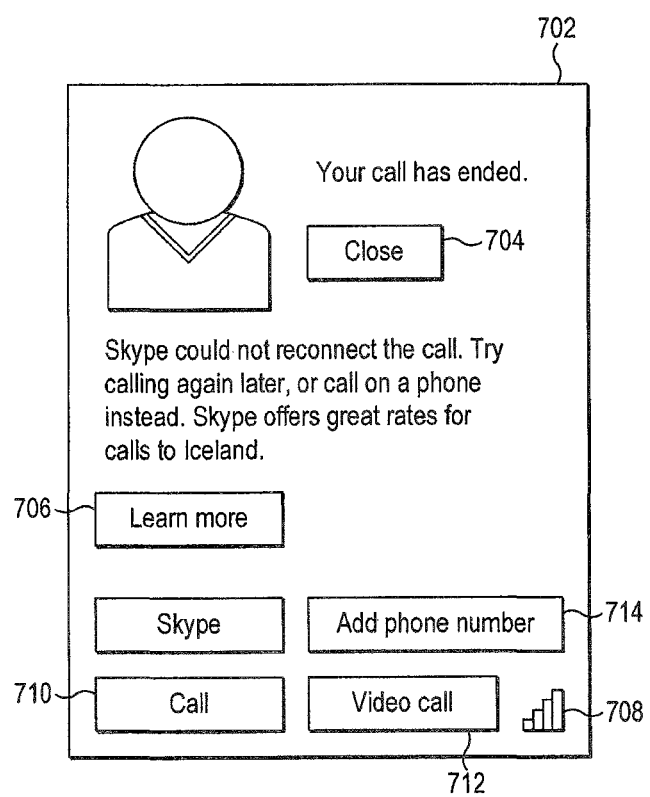
FIG. 7 is a representation of a user interface displayed to the first user when the client has not succeeded in re-establishing a call according to a preferred embodiment.

FIG. 7 shows an example of a user interface 702 for a post call screen which is displayed to the user 102 when the user terminal 104 is in the post call state. The user interface 702 informs the user 102 that the call has ended and includes a button 704 which the user 102 can use to close the user interface 702, such that no further attempts to contact the users of the dropped call are initiated. The user interface 702 presents information to the user 102 indicating other various options for ways in which the user 102 may be able to contact the users of the dropped call and includes a button 706 on which the user 102 can click to learn more about these various options. The user interface 702 also includes buttons 710 and 712 which the user 102 can use to attempt to establish new calls with the users of the dropped call (either as an audio call, or as a video call). The network call quality indicator 708 indicates the current network quality experienced by the user terminal 104. The user interface 702 also includes a button 714 which the user 102 can click on in order to enter a new phone number for contacting the users of the dropped call in another way.

Figure 11:
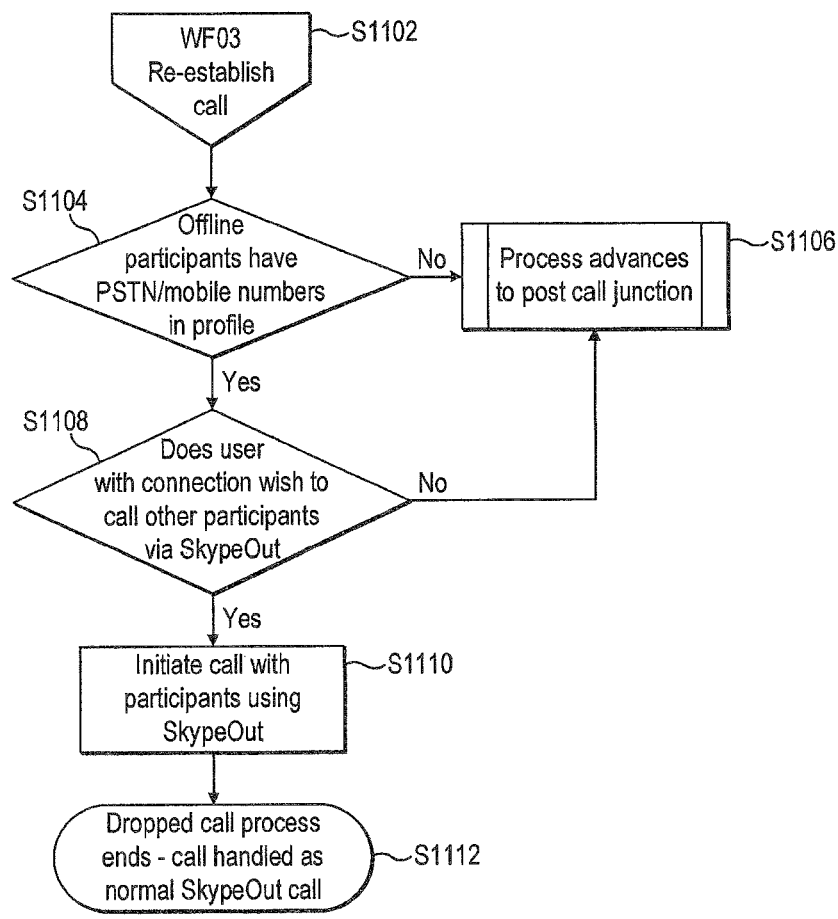
FIG. 11 is a flow chart for a process performed when a user terminal is in a post call state according to a preferred embodiment.

FIG. 11 is a flow chart for a process performed when the user terminal 104 is in the post call state. The process begins in step S1102 which follows from step S1008 shown in FIG. 10. The process then passes to step S1104 in which it is determined whether the users in the dropped call which could not connect to the network 106 (i.e. the offline users in the dropped call) have PSTN or mobile numbers in their profile. If these offline users do not have PSTN or mobile numbers in their profile then the method passes to step S1106 in which the user interface 702 is displayed to the user 102 and the call is not re-established.

However, if it is determined in step S1104 that the offline users do have a PSTN or mobile number in their profile then the method passes to step S1108 in which it is determined whether the user 102 wishes to call the offline users via a SkypeOut call, and if this is the case the method passes to step S1110 in which a call is initiated between the user 102 and the offline users via a SkypeOut call using a PSTN number or a mobile number from the offline user's profile. The method then passes to step S1112 in which the dropped call process ends and the call is then handled as a normal SkypeOut call. However, if in step S1110 it is determined that the user 102 does not wish to connect to the offline users via a SkypeOut call then the method passes to step S1106 in which the user interface 702 is displayed to the user 102 and the call is not re-established.

Figure 12:
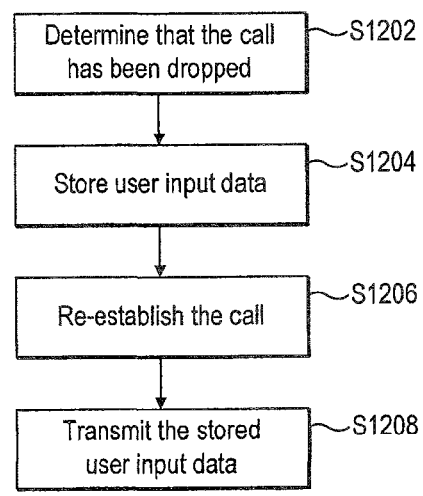
FIG. 12 shows a flow chart for a process of transmitting user input data according to preferred embodiments.

FIG. 12 shows a flow chart for a process of transmitting user input data according to preferred embodiments. In step S1202 the client 108 determines that the call has been dropped. This can be performed as described above, e.g. when a data stream has been lost for at least 15 seconds or there is a failure on a stream independent signalling channel used in the call. Whilst the call is dropped the user terminal 104 may store user input data received from the user 102. For example, the user input data may be voice data (or "speech data") received at the microphone 212 or video data captured by the webcam 225. The call is re-established in step S1206. The call may be re-established as described above, that is, automatically by the client 108.

When the call has been re-established the stored user input data is transmitted from the user terminal 104 to the other user terminals in the re-established call. This allows user input data to be received at the user terminal 104 during a period between the call being dropped and the call being re-established and for this user input data to be subsequently transmitted to the other users in the re-established call. As described above in relation to FIG. 4, the call data received at user terminal 112 over the network 106 is input to the jitter buffer 404. The output rate of the data that was received at the user terminal 104 during the period between the call being dropped and the call being re-established from the jitter buffer 404 may be adjusted to be higher than that for normal data received in the call. In this way, the data can be output more quickly than usual such that further data transmitted in the call can subsequently be output without any extra delay. The method shown in FIG. 12 is particularly useful when combined with the automatic re-establishment process described above, since it allows the user 102 to continue inputting data for the call (e.g. to continue speaking) whilst the client re-establishes the call and none of the user input data is lost from the call despite a temporary drop in the call. Since the user 102 is not required to perform any actions to re-establish the dropped call the user can continue with the call, if it can be successfully re-established, effectively as if the drop in the call did not occur (this is possible when the time period for which the call is dropped is short, i.e. below a threshold time period). If the time period for which the call is dropped is longer than a threshold time period then the method of buffering data described above with reference to FIG. 12 is not sufficient to allow the user to continue with the call effectively as if the drop in the call did not occur. When the call is dropped, the user 102 may be notified that the speech data received from him will be handled differently, thereby giving the user 102 the opportunity to adjust the conversation accordingly. For long drop-outs (i.e. call drops lasting longer than the threshold time period), the "experienced duration" of drop-out for the user 102 can be shortened, e.g. by delaying notifications (such as those described above which may notify the user 102 that the call is dropped or that a re-establishment process for the call is ongoing). However some notifications, such as those displaying that the network conditions are bad, should not be delayed. The "experienced duration" of a dropped call is the duration that the user 102 perceives that the call has been dropped for.

Even when the duration of a call drop is longer than the threshold time period such that the user cannot continue with the call effectively as if the drop in the call did not occur, the method of buffering input data (described with reference to FIG. 12) can be useful by shortening the "experienced duration" of a call drop, to below the actual duration for which the call is dropped. For example, if the notification that is output to the user 102 when a call is dropped aims to inform the user of the call drop so that he can adapt to the call drop (for example, the notification may state "don't speak" or "call dropped" or "hold") then the experienced duration of the call drop can be reduced by buffering on the sending side (as described above) and deliberately not notifying the user 102 that the call is dropped immediately when a call is dropped, and instead only notifying the user 102 that the call is dropped at a later point when the call drop cannot be hidden from the user 102 any longer due to the long duration of the call drop. However, if the notification that is output to the user 102 when a call is dropped aims to prevent an experienced call drop (for example, the notification may state "your network quality is decreasing, move to a location with a better signal strength"), then it may be beneficial to output this notification to the user immediately when a call is dropped.

The output rate of the user input data from the jitter buffer 404 can be adjusted in dependence upon the amount of time between the call being dropped and the call being re-established. For example when there is a large amount of time between the call being dropped and the call being re-established the output rate of the jitter buffer 404 may be increased more than if there is a smaller amount of time between the call being dropped and the call being re-established. This allows the time taken for the stored user input data to be output from the jitter buffer 404 to be adjusted according to the length of time over which the stored user input data was recorded at the user terminal 104.

There has therefore been described methods for automatically (that is, without user intervention) re-establishing a dropped call.

While this invention has been particularly shown and described with reference to preferred embodiments, it will be understood to those skilled in the art that various changes in form and detail may be made without departing from the scope of the invention as defined by the appendant claims.

What is claimed is:

1. A method comprising:
   determining, by a first device, that a call over a communications network has been dropped;
   attempting to re-establish the call between the first device and at least one other device;
   receiving user input data, from a user of the first device, after the call is dropped and before the call is re-established;

storing the user input data; and responsive to re-establishment of the call, transmitting the stored user input data to the at least one other device in the call.

2. A method as recited in claim 1, wherein the user input data comprises audio data, video data, or audio/video data.

3. A method as recited in claim 1, further comprising automatically attempting, by the first device, to re-establish the call.

4. A method as recited in claim 1, further comprising automatically attempting, by the first device, to re-establish the call for a predefined duration of time, the first device being configured to, in an event that the call is not re-established within the predefined duration of time, terminate the call and present to the user one or more reasons that the call dropped.

5. A method as recited in claim 1, wherein the stored user input data is transmitted for receipt at a jitter buffer that is configured to output the user input data at an output rate that is relatively higher than a rate at which data for the call is output before the call is dropped.

6. A method as recited in claim 1, further comprising shortening a user-perceived duration of drop-out time for the call by at least delaying a notification to the user that the call has been dropped or that the call has been re-established.

7. A method as recited in claim 1, further comprising notifying the user of a potential problem with at least one network connection of the communications network.

8. A method as recited in claim 1, further comprising monitoring at least one network connection of the communications network to detect an event indicative of a potential problem with the at least one network connection.

9. A method as recited in claim 8, further comprising adjusting a sensitivity of detection of adverse conditions as events indicative of potential problems with the at least one network connection.

10. A method as recited in claim 8, further comprising notifying the user of the first device of the potential problem with the at least one network connection.

11. A method as recited in claim 1, further comprising:
transmitting, by the first device, a call request to the at least one other device in an attempt to re-establish the call;
receiving an incoming call request from the at least one other device to re-establish the call; and
merging the incoming call with the call request to re-establish the call between the first device and the at least one other device.

12. A computing device comprising:
one or more processors configured to utilize instructions in a memory to implement a call manager module configured to:
monitor a call over a communications network between the computing device and at least one other device to identify one or more events indicative of a problem with a network connection used for the call;
based on the one or more events, determine that the call has been dropped;
receive user input data subsequent to the call being dropped and before the call is re-established;
store the received user input data;
re-establish the call between the computing device and the at least one other device; and
responsive to re-establishment of the call, transmit the stored user input data to the at least one other device participating in the call.

13. A computing device as recited in claim 12, wherein the user input data includes audio data, video data, or audio/video data.

14. A computing device as recited in claim 12, wherein the call manager module is further configured to automatically attempt to re-establish the call.

15. computing device as recited in claim 12, wherein the call manager module is further configured to shorten a user-perceived duration of drop-out time for the call by at least delaying a notification of the dropped call to the user.

16. A computing device as recited in claim 12, wherein the call manager module is further configured to notify a user of the computing device of the potential problem with the network connection used for the call.

17. A computing device as recited in claim 12, wherein the call manager module is further configured to:
transmit a call request to the at least one other device in an attempt to re-establish the call;
receive an incoming call request from the at least one other device to re-establish the call; and
merge the incoming call request with the call request to re-establish the call between the computing device and the at least one other device.

18. A computing device as recited in claim 12, wherein the call manager module is further configured to adjust a sensitivity of detection of events that are indicative of problems with the network connection used for the call, the sensitivity being adjustable based on updates to one or more parameter values that are used to define a performance level of the network connection used for the call.

19. A system comprising:
a memory; and
a processor configured to utilize instructions in the memory to cause a user terminal to:
establish a call between the user terminal and at least one additional user terminal over a communications network;
determine that the call has been dropped;
responsive to a determination that the call has been dropped:
store user input data that is received at the user terminal after the call has been dropped and prior to re-establishment of the call;
attempt to re-establish the call between the user terminal and the at least one additional user terminal; and
in an event that the call is re-established, transmit the stored user input data to the at least one additional user terminal.

20. A system as recited in claim 19, wherein the processor is further configured to utilize the instructions to cause the user terminal to:
transmit a call request to the at least one additional user terminal in the attempt to re-establish the call;
receive an incoming call request from the at least one additional user terminal to re-establish the call; and
merge the incoming call request with the call request to re-establish the call between the user terminal and the at least one additional user terminal.

* * * * *